United States Patent [19]
Ohayon

[11] Patent Number: 5,402,476
[45] Date of Patent: Mar. 28, 1995

[54] TWO-PART APPARATUS AND METHOD FOR PROTECTING COIN-OPERATED TELEPHONES

[75] Inventor: David Ohayon, Hewitt, N.J.

[73] Assignee: Renault Metal Products, Ltd., Middle Village, N.Y.

[21] Appl. No.: 99,932

[22] Filed: Jul. 29, 1993

[51] Int. Cl.6 .................... H04M 17/00; H04M 9/00; H04M 1/00
[52] U.S. Cl. .................... 379/145; 379/437; 379/440; 379/451
[58] Field of Search .............. 379/143, 145, 437, 440, 379/451

[56] References Cited

U.S. PATENT DOCUMENTS

| | | |
|---|---|---|
| 2,716,882 | 9/1955 | Gill et al. . |
| 3,213,210 | 10/1965 | Samples . |
| 3,297,123 | 1/1967 | Hutchins . |
| 3,335,945 | 8/1967 | Hutchins . |
| 3,391,256 | 7/1968 | Nawman . |
| 3,833,104 | 9/1974 | Blum . |
| 3,868,483 | 2/1975 | Trimmer .................... 379/143 |
| 3,910,393 | 10/1975 | de Crepy . |
| 4,159,054 | 6/1979 | Yoshida . |
| 4,267,411 | 5/1981 | Raines . |
| 4,406,358 | 9/1983 | Zahradnik . |
| 4,645,876 | 2/1987 | Albertson .................... 379/143 |
| 4,946,095 | 8/1990 | Anello et al. . |
| 4,974,257 | 11/1990 | Ibanez .................... 379/143 |
| 5,018,193 | 5/1991 | DeArkland . |
| 5,054,056 | 10/1991 | Blythe .................... 379/145 |
| 5,131,035 | 7/1992 | Ohayon .................... 379/143 |
| 5,134,654 | 7/1992 | McGough .................... 379/437 |
| 5,148,476 | 9/1992 | Zausner .................... 379/143 |
| 5,155,765 | 10/1992 | McGough .................... 379/437 |

OTHER PUBLICATIONS

Linda M. Barrett, "Renault Secures Payphones," *Payphone Exchange*, Sep. 1989, p. 9.

*Primary Examiner*—Stephen Chin
*Assistant Examiner*—Vijay Shankar
*Attorney, Agent, or Firm*—Dilworth & Barrese

[57] ABSTRACT

The invention described herein provides a protective cover assembly for a coin-operated telephone having a coinbox-containing region which includes a protective cover plate dimensioned and configured for removable attachment adjacent the coinbox-containing region of the telephone, and a removable access plate associated with the protective cover plate for gaining access to the coinbox disposed within the coinbox-containing region of the telephone. The two-part construction eliminates the need for removal of the full protective cover assembly in order to gain access to the coinbox of the telephone.

18 Claims, 3 Drawing Sheets

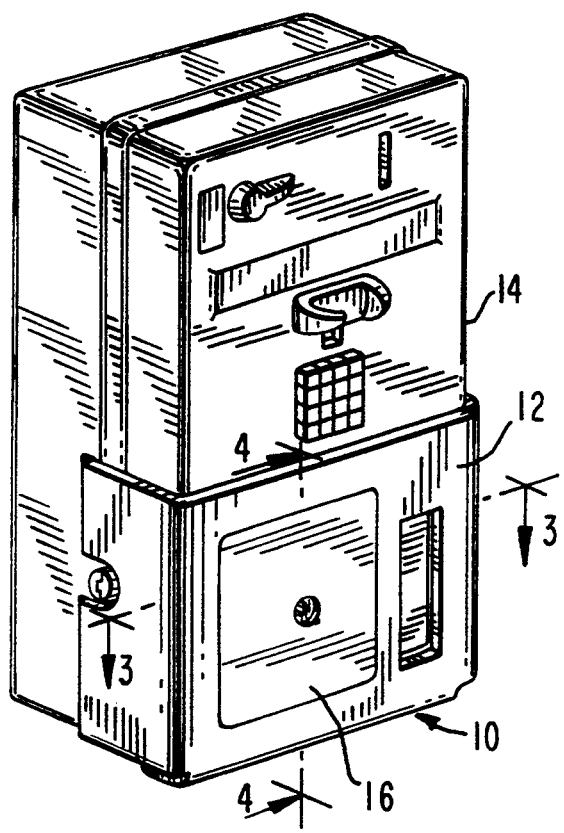
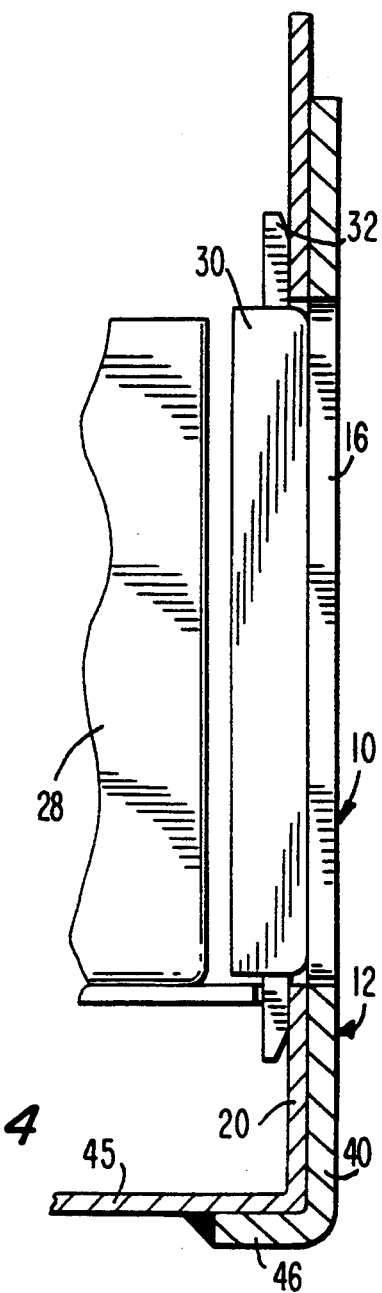

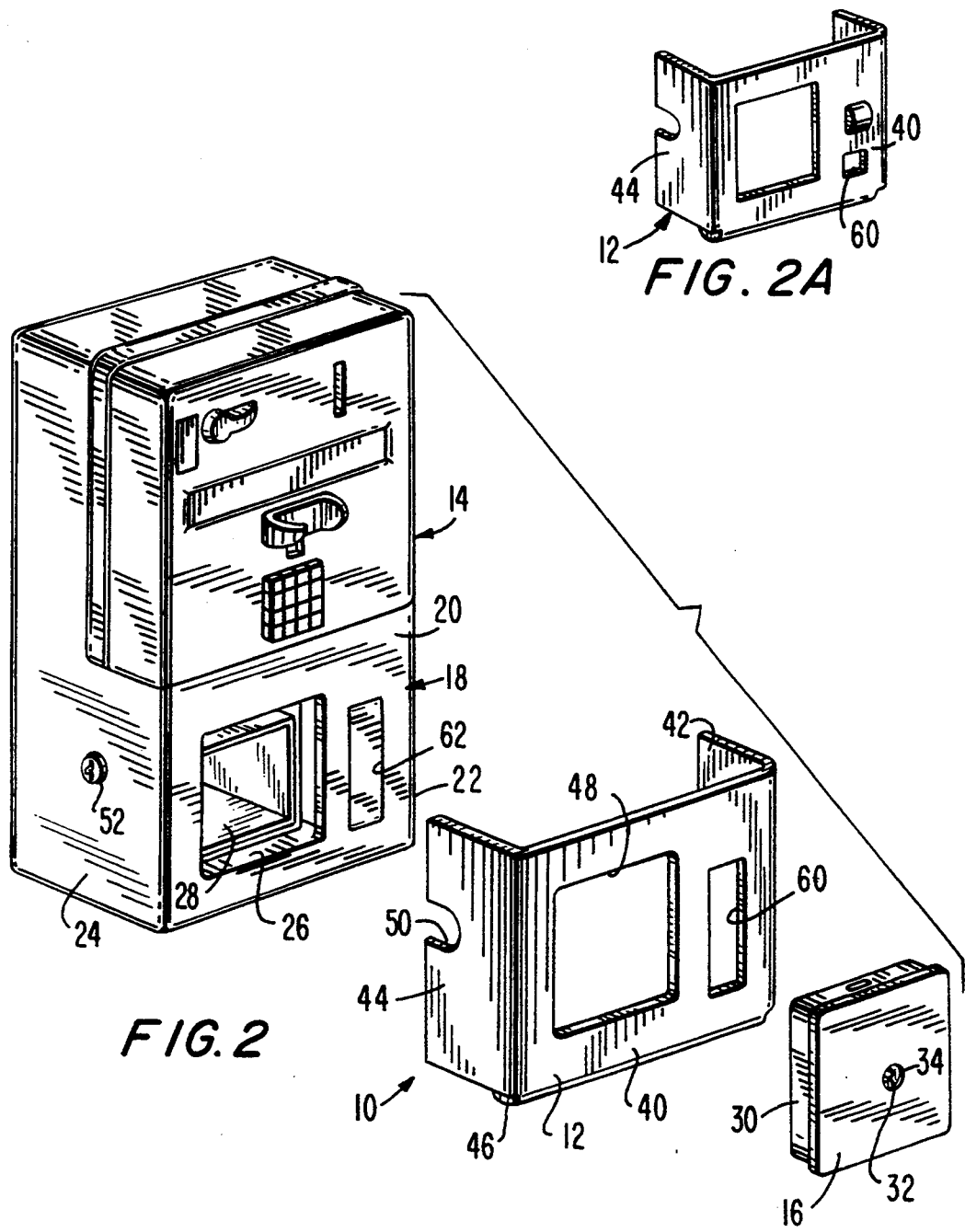

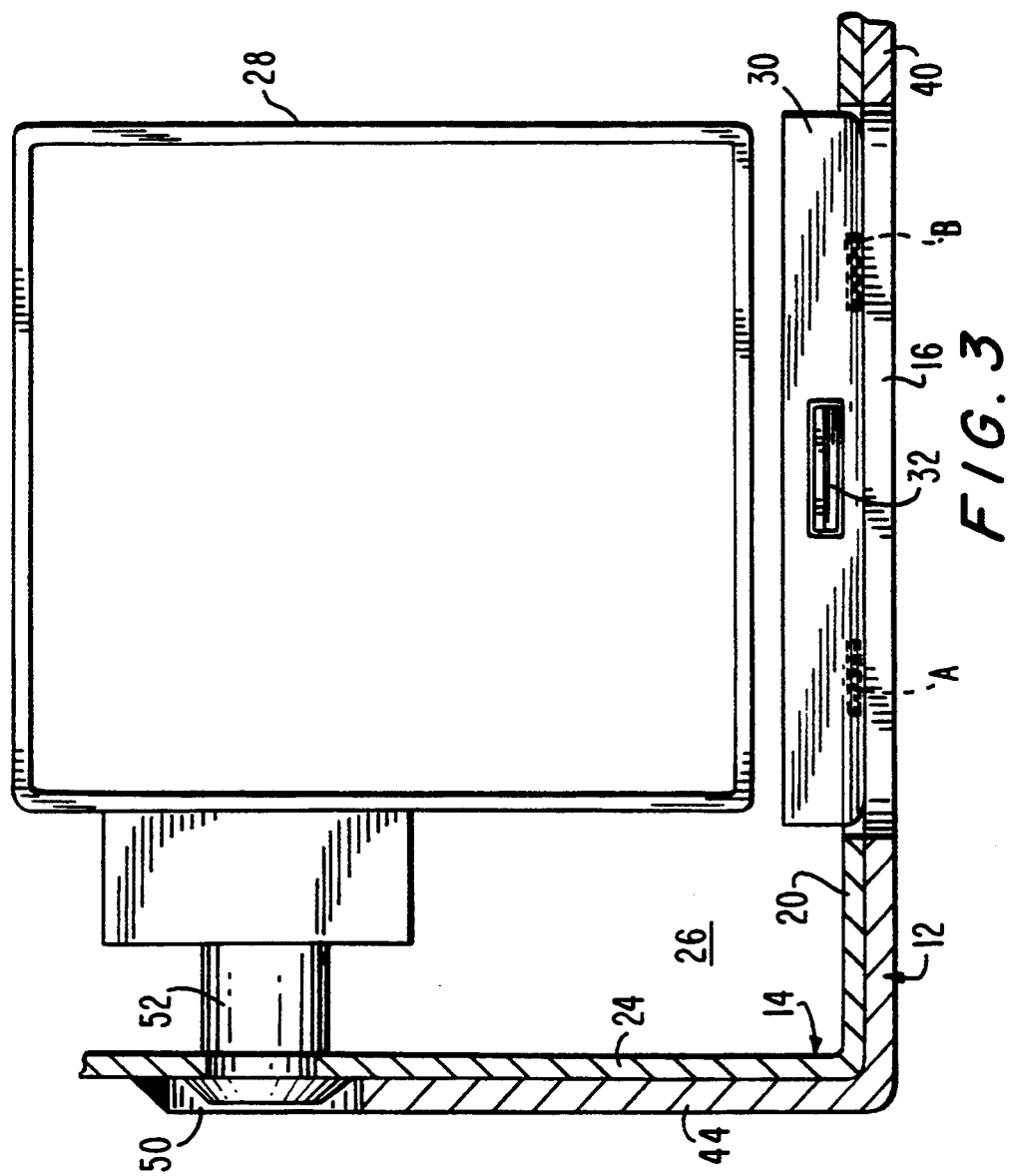

TWO-PART APPARATUS AND METHOD FOR PROTECTING COIN-OPERATED TELEPHONES

BACKGROUND OF THE INVENTION

1. Field of the Invention

This invention relates to an apparatus for protecting coin-operated telephones from unauthorized removal of user deposited coins, and more particularly to a two-part protective cover assembly dimensioned to protect the coinbox-containing region of the telephone.

2. Description of Related Art

Over extended periods of time, public coin-operated telephones become a repository for a significant amount of user deposited coins. As a result, coin-operated telephones are often the objects of vandalism and the targets for robbery.

In the past, attempts were made to safeguard public coin-operated telephones from unauthorized access by thieves and vandals. An example of an early device for this purpose is described in U.S. Pat. No. 3,213,210. A later protective device is described in U.S. Pat. No. 3,910,393. These cover devices failed however, to protect the regions of the telephone adjacent the coinbox and thus provided vandals with alternative areas of access. Furthermore, these covers were not fabricated of sufficiently heavy duty materials to provide adequate protection for the telephone. Thus, they were subject to removal or prying by structural tools.

A more recent protective cover which encases substantially the entire coinbox-containing region of a coin-operated telephone is disclosed in U.S. Pat. No. 5,131,035, U.S. Pat. No. 5,148,476, and U.S. patent application Ser. No. 07/852,527 which is a continuation of U.S. Pat. No. 4,148,476. Each of these documents describe protective covers which are effective at preventing unauthorized access to the coinbox contained within a public telephone. However, to remove user-deposited coins, access to the coinbox by authorized personnel requires removal of the entire protective cover and replacement of the cover after the coins are removed.

Accordingly, in view of the relative bulk and weight of these covers, it is desirable to provide a protective cover assembly which will effectively prevent unauthorized access to the coinbox contained within a public telephone, while permitting easy and convenient access to the coinbox by authorized personnel. I have invented a protective cover assembly which facilitates convenient and ready access to the coinbox of the telephone.

SUMMARY OF THE INVENTION

A protective cover assembly for a coin-operated telephone having a coinbox-containing region is provided which comprises a protective cover plate dimensioned and configured for attachment adjacent the coinbox-containing region of the telephone. The cover plate includes means for gaining access to the coinbox of the telephone. A removable access plate is associated with the protective cover plate for protecting the coinbox access means.

Preferably, the protective cover plate is permanently attached to the telephone and includes a front face dimensioned to extend across the width of the telephone and depending lateral flanges for protecting side regions of the telephone. An access port is formed in the front face of the protective cover plate for gaining access to the coinbox of the telephone. In a preferred embodiment of the subject invention, the vault door of the coinbox is welded to an internal surface of the removable access plate and the access plate is provided with a key port for permitting authorized access to a lock associated with the vault door of the coinbox. The protective cover plate of the assembly further comprises coin return access means formed therein adjacent a coin return opening of the telephone, and an opening for permitting key access to a second lock associated with the coinbox and positioned on a side region of the telephone.

A method of protecting a coin-operated telephone from unauthorized removable of user deposited coins is also provided which includes the steps of providing a protective cover plate which is dimensioned and configured to be attached to a telephone so as to extend across the width of the telephone in the coinbox-containing region thereof, providing an access port in the protective cover plate for gaining access to the coinbox of the telephone, mounting the entry door of the coinbox adjacent an internal surface of a removable access plate, positioning the removable access plate in the access port of the cover plate and locking the entry door of the coinbox to prevent unauthorized removal of the user deposited coins from the telephone. Preferably, the entry door of the coinbox is mounted adjacent the internal surface of the removable access plate by welding.

Further features of the subject invention will become more readily apparent from the following detailed description of the invention taken in conjunction with the drawings.

BRIEF DESCRIPTION OF THE DRAWINGS

Preferred embodiments of the subject invention are described hereinbelow with respect to the drawings wherein:

FIG. 1 is a perspective view of the protective cover assembly in accordance with a preferred embodiment of the subject invention positioned on a coin-operated telephone;

FIG. 2 is a perspective view with parts separated for convenience of illustration of the protective cover assembly for a coin-operated telephone of FIG. 1;

FIG. 2A is a perspective view of another embodiment of the cover plate of the protective cover assembly of the subject invention;

FIG. 3 is a cross-sectional view of the protective cover assembly of the subject invention taken along line 3—3 of FIG. 1; and FIG. 4 is a cross-sectional view of the protective cover assembly of the subject invention taken along line 4—4 of FIG. 1.

DETAILED DESCRIPTION OF THE PREFERRED EMBODIMENTS

A two-part protective cover assembly for a coin-operated telephone in accordance with a preferred embodiment of the subject invention is illustrated in FIG. 1 and is designated generally by reference numeral 10. In brief, the two-part cover assembly 10 comprises a cover plate 12 dimensioned and configured for permanent attachment adjacent the coinbox-containing region of a coin-operated telephone 14, and a removable access plate 16 associated with cover plate 12 for gaining access to a coinbox disposed within the telephone 14 to remove user deposited coins. Cover plate 12 and access plate 16 are preferably constructed of a heavy weight durable material such as stainless steel plate having a 7 gauge thickness approximately equal to 3/16 of an inch. Cover plate 12 serves to protect the coinbox-containing region of telephone 14 from unauthorized access by vandals or thieves, while the removable access plate 16 promotes convenient accessibility to the coinbox of the telephone by authorized personnel.

Referring to FIG. 2, the two-part protective cover assembly 10 of the subject invention is shown separated from the coin-operated telephone 14 to which it is normally permanently attached. As illustrated, coin-operated telephone 14 is defined by a coinbox-containing area 18 having a frontal region 20 bounded by right and left side regions 22 and 24. A compartment 26 is defined within the coinbox-containing area 18 of telephone 14 for housing a coinbox 28 within which user deposited coins are maintained until removed by authorized personnel. Coinbox 28 includes a door 30 traditionally referred to as a "vault door". Vault door 30 is preferably mounted to the internal surface of the removable access plate 16 of cover assembly 10. As best seen in FIG. 3, vault door 30 is preferably joined with access plate 16 at a plurality of weld points indicated for example at A and B, by a method referred to as blind welding. A blind weld, as the name suggests, provides a hidden weld location to conceal structural weaknesses from a vandal.

The vault or coinbox door 30 is locked and unlocked by means of a known locking mechanism 32 which may be accessed through a key hole 34 provided in access plate 16. Since the coinbox door 30 is permanently attached to the internal surface of access plate 16, unlocking the coinbox door 30 will effectuate removal of access plate 16 from the cover plate 12 of assembly 10 to enable authorized retrieval of user deposited coins.

Referring once again to FIG. 2, cover plate 12 is defined by a frontal portion 40 which is dimensioned and configured to cover the entire width of the coinbox-containing area 18 of the coin-operated telephone 14, and right and left lateral flanges 42 and 44 dimensioned to respectively protect side regions 22 and 24 of telephone 14. In addition, as best seen in FIG. 4, a lower lip 46 depends rearwardly from the frontal portion 40 of cover plate 12 to protect at least a portion of the undersurface 45 of telephone 14 in the coinbox-containing area 18 thereof.

A substantially rectangular coinbox access port 48 is defined in a frontal portion 40 of cover plate 12 for reception of the removable access plate 16. Access port 48 is dimensioned to achieve a snug interfit between the two pieces of cover assembly 10. Moreover, the close interface between the peripheral surface of access plate 16 and the periphery of access port 48 will serve to prevent vandals from prying the plates of the assembly apart to reach the coinbox. A cut out section 50 is defined in the left lateral flange 44 of cover plate 12 to provide access to a second optional lock and key cylinder 52 located on the left side 24 of telephone 14. Unlocking key cylinder 52 will permit authorized removal of the entire coinbox 28 from compartment 26 of telephone 14.

A coin return access slot 60 is defined adjacent access port 48 for gaining access to a coin return slot 62 provided in telephone 14 through which user deposited coins are returned. The dimensions of the coin return access port 60 can vary depending upon the telephone with which the protective cover assembly 10 is associated. For example, if the telephone is provided with an anti-stuffing mechanism to prevent the introduction of jamming devices or explosives which can be used to destroy the telephone and remove the coins illegally from the coinbox, the dimensions of the coin return access slot 60 may be substantially equal to the dimensions of the coin return slot 62 of the telephone itself. However, if the telephone is not provided with an anti-stuffing mechanism, the dimensions of the coin return access port 60 will be substantially smaller than the dimensions of the coin return slot 62 to physically prevent the insertion of jamming devices or explosives. In such instances, the dimensions of the port may be approximately 11/8" in height and ⅞" in width to permit sufficient access to the telephone coin return, yet prevent entry of illegal devices as illustrated in FIG. 2A. In addition, depending upon the configuration of the telephone, the relative portions of the access port 48 and the coin return access slot 60 may be revised such that the coin return access slot 60 is on the left side and the access port 48 is to the right of the slot 60.

In summary, the apparatus of the subject invention provides a two-part protective cover assembly for a coin-operated telephone which includes a removable access plate configured to provide convenient access to the coinbox disposed within the telephone by authorized personnel who may periodically remove the coins from the coinbox utilizing authorized validly issued keys.

Although the apparatus and method of the subject invention have been described with respect to a preferred embodiment, it is apparent that changes or modifications made be made thereto without departing from the spirit or scope of the invention as defined by the appended claims.

What is claimed is:

1. A protective cover assembly for a coin-operated telephone having a coinbox-containing region, which comprises:

a) a first plate dimensioned and configured for attachment adjacent the coinbox-containing region of the telephone, said first plate defining a generally planar front face portion including means for gaining authorized access to the coinbox of the telephone, and an underturned flange which depends therefrom to protect an undersurface portion of the telephone; and b) a second plate associated with and complementary to said first plate for protecting said means for gaining authorized access to said coinbox, said second plate having a generally planar front face portion, said generally planar front face portion of said first plate and said generally planar front face portion of said second plate are in generally planar alignment when said second plate is in a position to prevent unwanted insertion of a foreign object between said first plate and said second plate and thereby inhibit unauthorized access through said coinbox access means.

2. A protective cover assembly as recited in claim 1, wherein said front face portion of said first plate is dimensioned to extend across the width of the telephone and depending lateral flanges to protect at least a side region of the telephone.

3. A protective cover assembly as recited in claim 2, wherein said coinbox access means comprises an access port formed in said front face portion of said first plate for reception of said second plate.

4. A protective cover assembly as recited in claim 1, further comprising coin return access means formed in said first plate adjacent a coin return opening of the telephone.

5. A protective cover assembly as recited in claim 1, wherein an entry door of the coinbox is welded to an internal surface of said second plate.

6. A protective cover assembly as recited in claim 5, wherein said second plate is provided with a key port for permitting access to a first lock associated with the entry door of the coinbox.

7. A protective cover assembly as recited in claim 1, wherein said first plate and said second plate are comprised of stainless steel plate.

8. A protective cover assembly as recited in claim 1, wherein said first plate includes an opening for permitting key access to a second lock associated with the coinbox and positioned on a side region of the telephone.

9. A protective cover assembly for a coin-operated telephone having a coinbox-containing region, which comprises:
   a) a protective cover plate dimensioned and configured for permanent attachment adjacent the coinbox-containing region of the telephone, said protective cover plate having an access port formed in a front face portion thereof for gaining authorized access to the coinbox of the telephone, said front face portion having a generally planar outer surface portion at least in an area surrounding said access port, and including a depending flange portion for covering at least a portion of the undersurface of the telephone; and
   b) a removable access plate associated with and complementary to said protective cover plate for protecting said access port, said access plate having a generally planar outer surface portion at least adjacent the periphery, said generally planar outer surface portion of said access plate and said generally planar outer surface portion of said front face portion of said cover plate being in adjacent relationship and in generally planar alignment with each other when said access plate is positioned within said access port to define a substantially continuous frontal surface region with said protective cover plate to prevent unwanted insertion of a foreign object between said access plate and said cover plate and thereby inhibit unauthorized access to said coinbox.

10. A protective cover assembly as recited in claim 9, wherein said front face portion is dimensioned to extend across the width of the telephone and depending lateral flanges are provided to protect at least a side region of the telephone.

11. A protective cover assembly as recited in claim 9, further comprising coin return access means formed in said protective cover plate adjacent a coin return opening of the telephone.

12. A protective cover assembly as recited in claim 9, wherein an entry door of the coinbox is welded to an internal surface of said removable access plate.

13. A protective cover assembly as recited in claim 12, wherein said removable access plate is provided with a key port for permitting access to a first lock associated with the entry door of the coinbox.

14. A protective cover assembly as recited in claim 9, wherein said protective cover plate and said removable access plate are comprised of stainless steel plate.

15. A protective cover assembly as recited in claim 9, wherein said protective cover plate includes an opening for permitting key access to a second lock associated with the coinbox and positioned on a side region of the telephone.

16. A method of protecting a coin-operated telephone from unauthorized removal of user deposited coins, the telephone containing a coinbox for reception of the user deposited coins, the coinbox having an entry door which includes a lock for removal of the user deposited coins, comprising:
   a) providing a protective cover plate dimensioned and configured for attachment to the telephone so as to extend across the width of the telephone in the coinbox-containing region and defining an access port in a front face portion for gaining access to the coinbox of the telephone, said front face portion having a generally planar outer surface portion at least in an area surrounding said access port, and including an underturned flange configured to protect an undersurface portion of the telephone;
   b) providing a removable access plate for protecting said access port in said protective cover plate, said access plate having a generally planar outer surface portion at least adjacent the periphery;
   c) mounting the entry door of the coinbox adjacent an internal surface of said removable access plate;
   d) positioning said removable access plate in said access port of said protective cover plate such that said generally planar outer surface portion of said access plate and said generally planar outer surface portion of said front face portion of said protective cover plate are in adjacent relationship and in generally planar alignment with each other to define a substantially continuous frontal surface region; and
   e) securing the entry door of the coinbox to prevent unauthorized removal of the user deposited coins from the telephone.

17. A method of protecting a coin-operated telephone according to claim 16, wherein the step of mounting the entry door of the coinbox adjacent said internal surface of said removable access plate is achieved by blind welding.

18. A protective cover assembly as recited in claim 9, wherein said underturned flange is welded to the undersurface of the telephone to further prevent removal of said protective cover plate from the telephone and to provide additional protection from unauthorized access to said coinbox.

* * * * *